(12) United States Patent
Johnson, Jr. et al.

(10) Patent No.: US 6,603,569 B1
(45) Date of Patent: *Aug. 5, 2003

(54) DEVICE, METHOD AND SYSTEM FOR FACSIMILE TRANSMISSION OVER A COMPUTER NETWORK

(76) Inventors: Howard K. Johnson, Jr., 8333 Whitesburg Dr. #1607, Huntsville, AL (US) 35802; Luis Ayala, 107 Bennington Way, Huntsville, AL (US) 35824; Steve Conklin, 514 Mill Rd., Madison, AL (US) 35758; Andrew Smith, 2001 Hodges Blvd. #502, Jacksonville, FL (US) 32224

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,433

(22) Filed: May 15, 1998

Related U.S. Application Data

(60) Provisional application No. 60/062,362, filed on Oct. 15, 1997.

(51) Int. Cl.[7] .............................. H04N 1/00; H04N 1/32
(52) U.S. Cl. ....................... 358/1.15; 358/442; 358/438; 358/407; 379/93.07; 379/93.24
(58) Field of Search ................................ 358/1.15, 402, 358/403, 407, 434, 442, 443, 468, 438; 709/239, 240, 238, 242; 370/352, 401; 379/90.01, 93.01, 93.05, 93.07, 93.09, 93.14, 93.24, 100.01, 100.09, 100.12, 100.13, 100.15

(56) References Cited

U.S. PATENT DOCUMENTS

| | | | |
|---|---|---|---|
| 5,014,300 A | * | 5/1991 | Harvath et al. ........ 379/100.09 |
| 5,115,326 A | | 5/1992 | Burgess et al. |
| 5,287,199 A | | 2/1994 | Zoccolillo |
| 5,287,202 A | | 2/1994 | Kumarappan |
| 5,291,479 A | * | 3/1994 | Vaziri et al. ................. 370/264 |
| 5,459,584 A | | 10/1995 | Gordon et al. |
| 5,461,488 A | | 10/1995 | Witek |
| 5,479,411 A | | 12/1995 | Klein |
| 5,483,352 A | | 1/1996 | Fukuyama et al. |
| 5,521,719 A | * | 5/1996 | Yamada ...................... 358/438 |
| 5,550,649 A | | 8/1996 | Wong et al. |
| 5,559,721 A | | 9/1996 | Ishii |
| 5,608,786 A | | 3/1997 | Gordon |
| 5,617,221 A | * | 4/1997 | DeVries et al. ............. 358/442 |
| 5,812,278 A | * | 9/1998 | Toyoda et al. .............. 358/402 |
| 5,838,461 A | * | 11/1998 | Hsieh ......................... 358/442 |
| 5,838,682 A | * | 11/1998 | Dekelbaum et al. ........ 370/401 |
| 5,862,202 A | * | 1/1999 | Bashoura et al. ....... 379/100.14 |

(List continued on next page.)

FOREIGN PATENT DOCUMENTS

| WO | WO97/10668 | * | 3/1997 | |
| WO | WO 97/10668 A1 | * | 3/1997 | ............ H04N/1/00 |
| WO | WO97/26753 | * | 7/1997 | |

*Primary Examiner*—Madeleine Nguyen
*Assistant Examiner*—Joseph R. Pokrzywa
(74) *Attorney, Agent, or Firm*—Lanier Ford Shaver & Payne P.C.

(57) ABSTRACT

A fax interface unit provides a novel way of sending and receiving a fax over a global computer network such as the internet. The fax interface unit is coupled to a legacy fax machine on one side and to both a local area network and the telephone network on the other side. When a first location transmits a fax document to a second location having an email address capable of receiving the fax document, the telephone network is bypassed and the transmitted fax document arrives as email at the second location, thereby reducing telephone cost and providing the second location with an archived document.

12 Claims, 16 Drawing Sheets

U.S. PATENT DOCUMENTS

| | | | | |
|---|---|---|---|---|
| 5,872,845 A | * | 2/1999 | Feder | 358/442 |
| 5,911,776 A | * | 6/1999 | Guck | 709/217 |
| 6,005,677 A | * | 12/1999 | Suzuki | 358/442 |
| 6,020,980 A | * | 2/2000 | Freeman | 358/402 |
| 6,025,931 A | * | 2/2000 | Bloomfield | 358/402 |
| 6,028,679 A | * | 2/2000 | Murphy | 358/407 |
| 6,058,169 A | * | 5/2000 | Bramnick et al. | 379/100.01 |
| 6,078,579 A | * | 6/2000 | Weingarten | 370/352 |
| 6,192,045 B1 | * | 2/2001 | Williams et al. | 370/352 |
| 6,211,972 B1 | * | 4/2001 | Okutomi et al. | 358/402 |

* cited by examiner

*FAXfree Portal Functional Block Diagram*

*Main Event Processing Loop*

*Legacy Fax Machine Off-hook Event Processing*

Telephone Number Lookup and Pass-through Dialing

*User Command Processing*

Receive Legacy Fax

Send Fax E-mail

*Incoming Call Processing*

*Process Configuration*

Print TIFF-F File

Check for E-mail

Process MIME Message

Finish Checking Mail

DEVICE, METHOD AND SYSTEM FOR FACSIMILE TRANSMISSION OVER A COMPUTER NETWORK

This application claims priority from provisional application Ser. No. 60/062,362 filed Oct. 15, 1997, entitled "Device and Method for Transmitting and Receiving Facsimile Documents Over a Global Computer Network" pursuant to 35 U.S.C. §119(e)(1).

BACKGROUND

Facsimile (fax) machines are routinely used to transmit and receive paper documents. Communication by fax has become widely accepted as a fast, efficient alternative to delivery of paper documents, such as by mail or courier.

One drawback to conventional faxing is the requirement of dedicated telephone lines connecting a source fax machine to a destination fax machine. In addition when sending a fax across long distances, the sender typically pays a toll charge for use of a long-distance telephone line. Also, transmitting a large number of pages by fax may require that phone lines be dedicated solely to transmitting a fax for long periods of time, making the phone line unavailable for other uses such as regular phone calls or perhaps a short urgent fax. Although fax transmission as currently used has some drawbacks, the fax has become an integral part of doing business.

Another drawback to conventional faxing is a reliance on paper documents. A paper document is fed into the source fax machine, and a paper document is printed by the destination fax machine. Once the fax is printed by the destination fax machine, the paper document must be routed to the intended recipient. If the routing system has flaws, the intended recipient might not receive the paper document in a timely manner. If the intended recipient is busy and cannot review the fax immediately, the paper document may get misplaced or lost. If the intended recipient is absent or otherwise away from the fax machine, the fax may have to be redirected to the recipient's temporary location resulting in additional cost.

Another drawback to conventional fax transmission is lack of a useful archiving method for a received fax at the destination location. Once the fax is printed by the destination fax machine, the data transmitted by the fax is typically not archived elsewhere, so that if the paper is lost at the destination, the entire transmission may have to be repeated, at additional cost.

Hence a need exists for an apparatus and method to overcome these and other drawbacks of fax transmission. It would be desirable for such an apparatus and method to be transparent to the user, to reduce telephone line cost, to provide means for redirecting the fax as necessary without incurring additional charges, and has an archiving method.

SUMMARY

The above drawbacks in fax transmission are met by the present invention. A first objective met by the present invention is to provide an apparatus and method that reduces the telephone cost of fax transmissions.

A second objective met by the present invention is an apparatus and method that allows fax users to archive the contents of fax transmissions.

A third objective of the present invention is to provide an apparatus and method to remotely access a fax transmission. This objective is met by utilizing the apparatus and method of the present invention.

A fourth objective of the present invention is to provide an apparatus and method for connecting a fax machine to a global computer network, such as the internet.

The above objectives and others are met by providing a fax interface unit that couples to a conventional fax machine. Such a conventional fax machine will be referred to as a legacy fax machine or fax machines. The fax interface unit also connects to a computer network including a global computer network such as the internet, which provides a low-cost communication medium linking multiple computer and fax machines having the fax interface unit.

DESCRIPTION OF PRIOR ART

Several non-traditional methods of sending and receiving fax have been described in the U.S. Patents summarized below. None of the known existing methods allow for transfer of fax documents over a computer network using the elements of the present invention. In addition the user of a fax machine in accordance with the present invention is typically unaware of the path taken by the received or transmitted document.

The process of converting and formatting data from one form to another form for transport over a communication channel is well known to those skilled in the art. The internet, a global computer network, currently transports video files, text files, graphic files and other types of files by converting and formatting data from one form into another form.

U.S. Pat. No. 5,479,411 issued to Robert M. Klein on Dec. 6, 1995 illustrates a method of integrating multimedia sources of information, such as voice and fax into an email message. The email message is sent over the internet or other computer networks and separated at the receiving end in accordance to the teachings of Klein. Klein does not have preassigned identifiers corresponding to an email address nor a line emulator coupled to a fax machine. Klein combines a fax signal and a voice signal forming an analog multimedia signal then uses a communication channel to transport the analog multimedia signal.

U.S. Pat. No. 5,550,649 issued to John J. Wong et al on Aug. 27, 1996 illustrates a multi-function telecommunication instrument that has a processor for combining and directing voice and fax signals. A voice annotated fax may be viewed on a personal computer or a television set. Further the instrument of Wong can store information for later viewing. However, Wong does not use the internet as a channel for transporting voice or fax signals and does not use preassigned identifiers.

U.S. Pat. No. 5,115,326 issued to Ken L. Burgess et al on May 19, 1992 illustrates a method for sending fax over the internet. Burgess places a bar code containing an email address on a fax cover sheet. When a fax server with a detection means, detects the email address in the bar code, the fax is delivered over a computer network to the email address. The method of Burgess requires a bar code to be placed on a cover sheet for each fax sent from a local fax machine to a remote fax machine. The present invention stores preassigned identifiers, entered by the sender, having corresponding email addresses.

U.S. Pat. No. 5,608,786 issued to Alastair T. Gordon on Mar. 4, 1997 illustrates a means for storing information at an access node. Each subscriber has an email address and may access fax, voice mail, email and other information at the access node. A subscriber checks for information at the access node in a manner similar to checking for email.

DETAILED DESCRIPTION OF THE PREFERRED EMBODIMENT.

Figure 1:
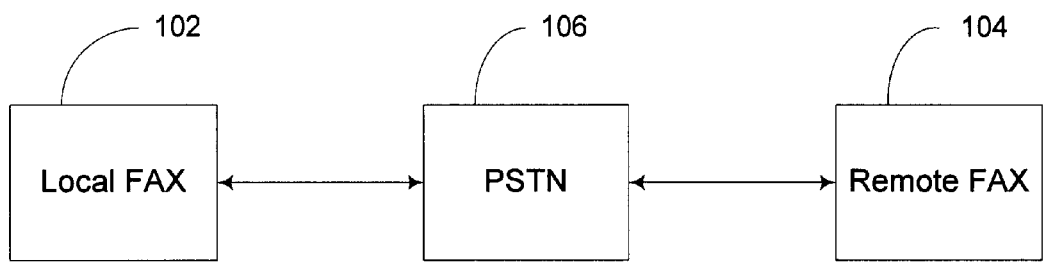
FIG. 1 is a block diagram of a conventional fax transmission system.

FIG. 1 is a block diagram of a typical prior art facsimile ("fax") transmission system. A local fax machine 102 is coupled to a remote fax machine 104 over a public switched telephone network ("PSTN") 106. In the prior art system, the user enters, on a keypad of the local fax machine, the phone number of the remote fax machine. If the remote fax machine is not busy and a phone connection is completed, the remote fax machine receives a fax signal, a data stream of fax information, through the telephone network. The fax signal is sent over the telephone network by a fax modem imbedded in the local fax machine and is received by a fax modem in the remote fax machine. Fax modems are well known to those in the art of data transmission over the PSTN. Although early fax machines used low-speed modems, many current fax machines use high-speed modems having speeds of around 28.8 kilobits per second. Even when high-speed modems are used the cost of sending a high page-count document may be significant. One prior art solution to the cost problem is to have a fax document stored for transmission at a time when telecommunications cost are reduced, such as evening long distance rates. Another prior art solution is to use a high-speed data connection such as an ISDN terminal adapter. The use of ISDN would be a satisfactory solution, but ISDN service is only available in limited areas and at a unacceptable cost to many users.

Figure 2:
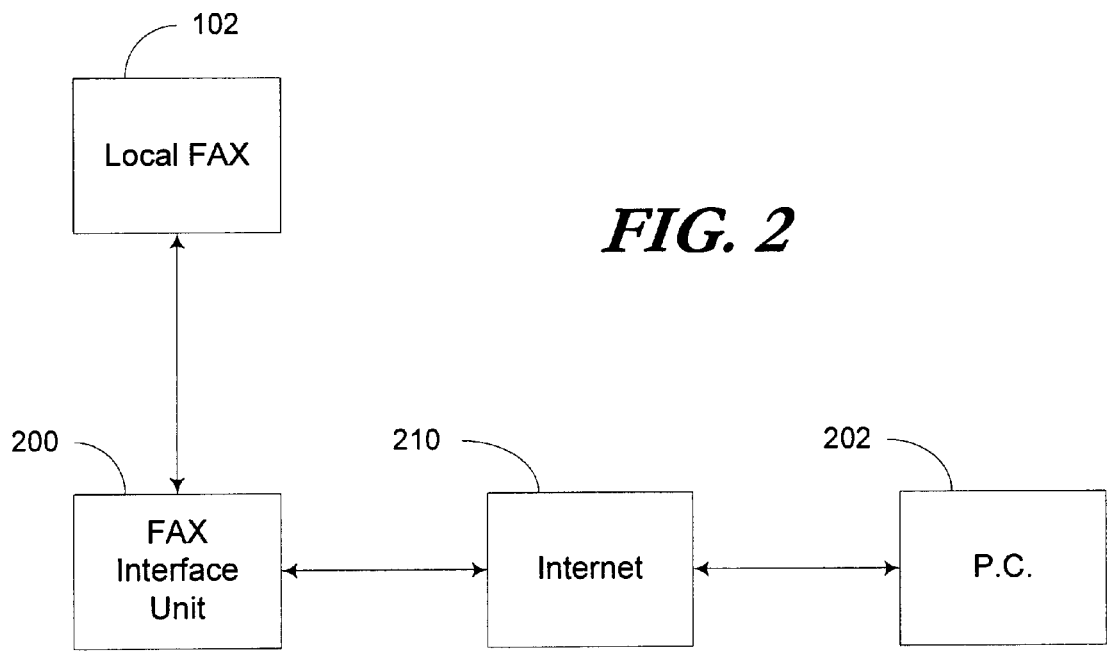
FIG. 2 is a block diagram of a fax transmission system in accordance with the present invention.
Figure 3:
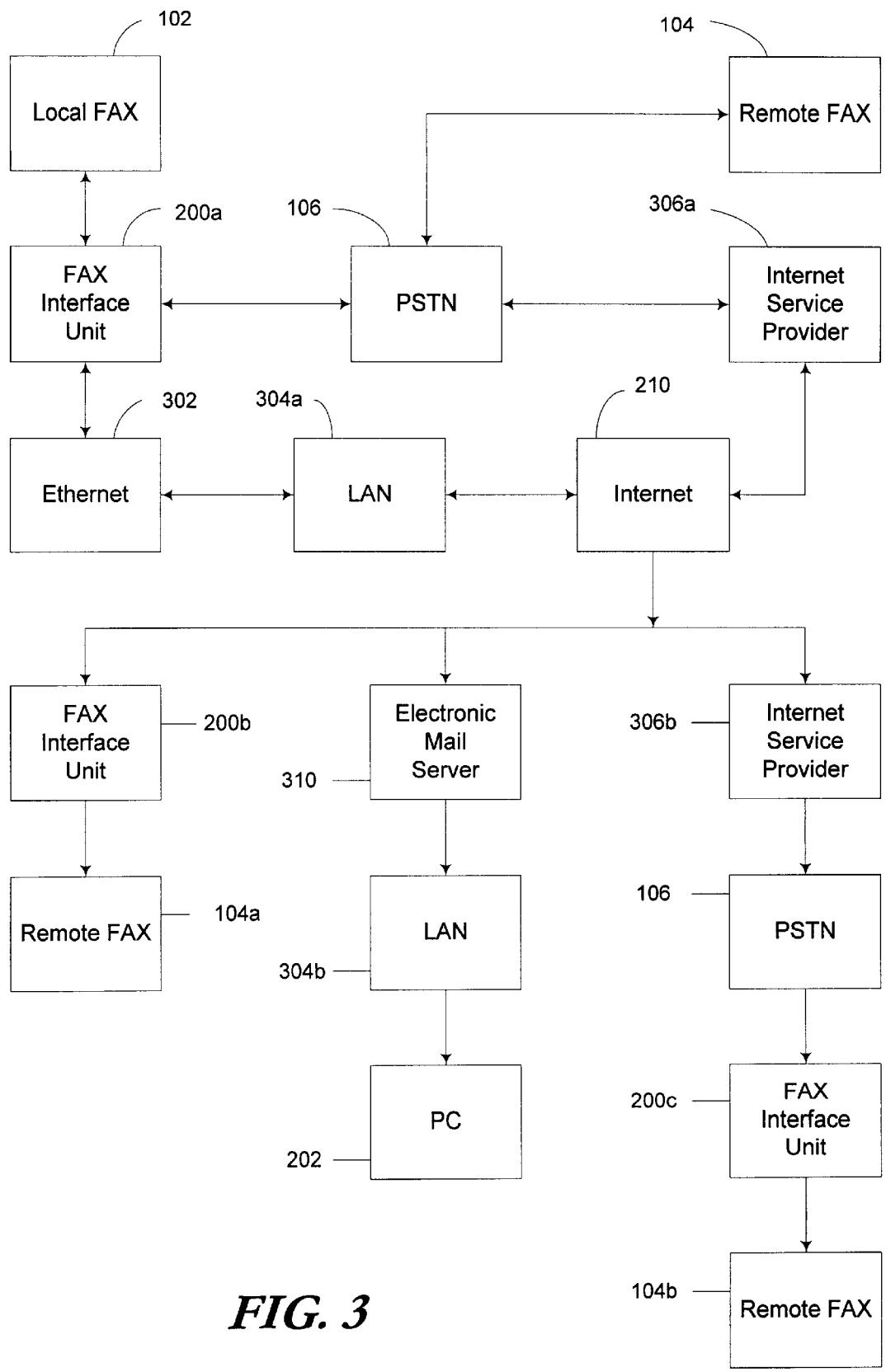
FIG. 3 is a block diagram of a fax transmission system having a plurality of communication channels in accordance with the present invention.

FIG. 2 is a block diagram an embodiment of the present invention having the local fax machine 102 coupled to a fax interface unit 200. The fax interface unit is further coupled to a computer network, such as the internet 210. The internet is coupled to a personal computer 202 at a remote location. Details of the fax machine coupling and the internet coupling are described in detail in FIG. 4 and FIG. 5. When a fax transmission is initiated according to the present invention, a user of the local fax machine enters a sequence of digits on a keypad of the local fax machine. The sequence of digits, typically a phone number, is a preassigned identifier for the remote location. Various combination of digits, characters, and symbols may also serve as preassigned identifiers. When the fax interface unit 200 receives dual tone multiple frequency ("DTMF") tones from the fax machine, representing the sequence of digits of the remote location, a table lookup procedure is initiated. The table lookup procedure, described in FIG. 8 when the preassigned identifier is a telephone number, associates an email address with the identifier. A communication path, several are illustrated in FIG. 3, within internet 210 is selected based on the email address as will be described later in more detail. After the communication path is selected, the local fax machine 102 transmits a fax signal, representing the content of the fax document, to the fax interface unit 200. Next the fax interface unit converts the fax signal to an email signal and sends the email signal over the communication path to the personal computer 202. The personal computer has a means for viewing and storing the email signal, thereby having a fax document that may be retained in the computer and later viewed or sent to a printer to obtain a paper copy.

The present invention provides an inexpensive way of transferring a fax document between a local fax machine and a personal computer at a remote location and further provides an archived copy of the fax. Because email is accessible from a plurality of locations, such as at the office, at home, or on the road, a fax document may be retrieved from a plurality of locations when using the present invention. In addition a fax document transported by the method of the present invention may be simultaneously sent to a plurality of locations, each having an email address.

FIG. 3 is a block diagram illustrating a variety of paths, serving as communication channels, that may be taken when transmitting a fax document from the local fax machine 102 in accordance with the present invention. Fax interface units 200a, 200b, and 200c are functionally equivalent to the fax interface unit 200. The local fax machine 102 is coupled to a fax interface unit 200a at a connector using a phone cable and phone jack, typically a RJ11. The fax interface unit further has an ethernet connector for coupling to a local area network ("LAN") and a telephone connector for coupling to the PSTN. When a fax transmission is initiated the fax interface unit directs the fax signal from the fax machine over one of several communication channels as will now be described. A fax transmission is initiated at the local fax machine by sending a number assigned a remote location, such as a telephone number, to the fax interface unit 200a. When the fax interface unit 200a receives the preassigned identifier, the identifier is compared with a list of stored identifier. If a stored identifier is the same as the sent preassigned identifier an email address is retrieved. The retrieved email address represents the destination of the fax document and the fax signal representing the document. The fax signal is converted to an email format, generating an email signal, and then directed towards a computer network where the computer network may be a combination of LANs, wide area networks ("WANs"), intranets, internets, second generation internets, and other networks.

For illustrating the use of the present invention and not as a limitation thereon, a specific arrangement of network elements is shown in FIG. 3. In an office arrangement having a LAN, the typical communication channel from the local fax machine to a remote location would have the LAN as a channel element. The communication channel from the local fax 102 would go to the fax interface unit 200a, then to the ethernet interface 302, then local LAN 304a and to the internet 210. When the email signal reaches the internet it may take one of several paths to the remote location. In a first example fax interface unit 200b receives the email signal from the internet and converts the email signal to a signal recognized by the remote fax 104a. A second example shows an email server 310 coupled to a remote LAN 304b followed by a personal computer 202. Yet a third example shows the internet coupled to a remote internet service provider 306b, the PSTN 106, fax interface unit 200c and finally remote fax machine 104. Numerous other arrangements for coupling the email signal from the internet to a receiving device are possible and are known to those familiar with email service. Typical receiving devices are a fax machine and a personal computer with viewer software, such as the image viewer contained in Microsoft products. Also shown as in FIG. 3 is a second path to the internet, typically used when a LAN is not available. The second path to the internet uses the PSTN 106 to connect to a local internet service provider 306a thereby providing another communication channel for the email signal to the internet. The present invention may use other arrangements or communication channels for delivering email from a first location to a second location. Such other arrangements are well-known to those working on email delivery methods.

When the assigned number is sent from the local fax machine to the fax interface unit 200a does not have a corresponding email address then a switch 422 in the fax interface unit sends the fax signal over the PSTN to the remote fax machine 104c. In the case where no email address matches the number from the local fax machine there is no conversion to an email signal and the communication channel is a circuit on the PSTN.

The fax interface unit 200a provides fax service from a local fax machine to remote locations having an email address and receiving device for viewing an email signal containing an fax signal. However when any remote location is identified exclusively by a telephone number and there is no email address, then a fax document is delivered using conventional methods.

Figure 4:
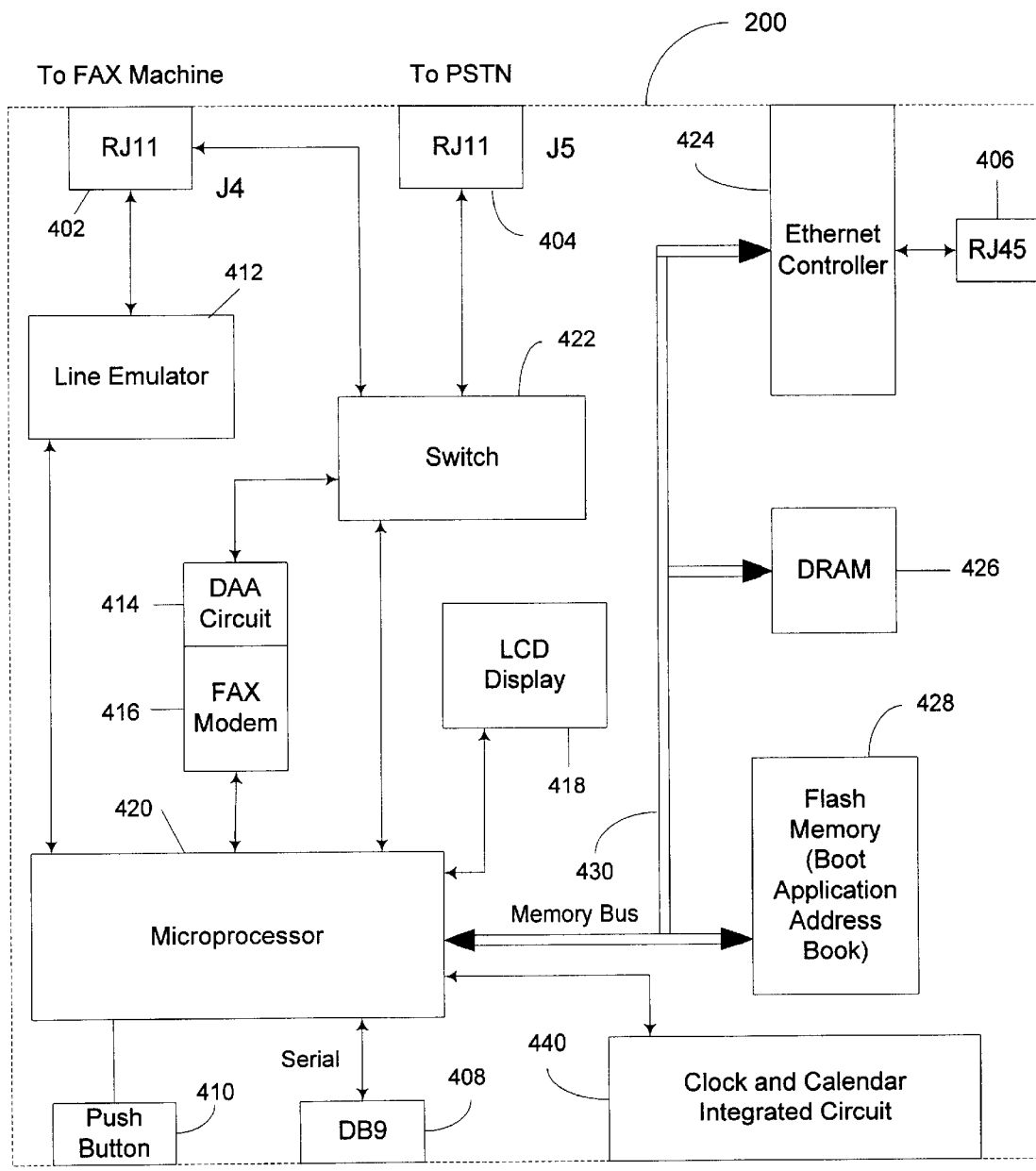
FIG. 4 illustrates hardware elements of a fax interface unit in accordance with the present invention.

Details of the fax interface unit 200 is illustrated in the block diagram of FIG. 4. The fax interface unit has a fax machine jack 402, a telephone line jack 404, a LAN jack 406, and a serial connector 408. The serial connector is connected to a personal computer when the fax interface unit is configured. The fax machine jack 402 is used to couple a fax machine to the fax interface unit. The PSTN is coupled to the fax interface unit using the telephone line jack 404. The LAN jack is used to couple the fax interface unit to a local area network, such as a 10 base T ethernet network or similar network. A LCD display 418 provides a means for observing status information about the fax interface unit. A push button 410, when pressed, causes the fax Interface unit to query an email server and display on the LCD display if any email is available for processing by the fax interface unit.

When a fax machine is connected to the fax interface unit 200 using fax machine jack 402, the fax machine is coupled to a line emulator 412. The line emulator provides line current, dial-tone, ring signals, and busy signals typically furnished by a telephone network central office. The line emulator 412 also decodes DTMF tones and traps the corresponding digits dialed by local fax machine 102. The digits are sent to a microprocessor 420 over a coupling from the line emulator. The line emulator is also coupled to a switch 422 where the switch array is used to selectively switch analog signals within the fax interface unit. The line emulator 412 also supports a "pass-through" mode in which the fax machine jack 402 and the phone line jack 404 are coupled together through the switch 422. This pass-through mode allows the local fax machine to be connected directly to the phone line.

The microprocessor 420 controls signal flow and other operations of the fax interface unit. In the present embodiment the microprocessor is an Intel 386EX processor. In other embodiments a microprocessor from same or other manufacturers could provide all the functions necessary for the present invention. Functions supported by the microprocessor include an email lookup, data formatting, processing of display information, receiving and storing digits from the line emulator, generating timer signals, and other signals.

Figure 5:
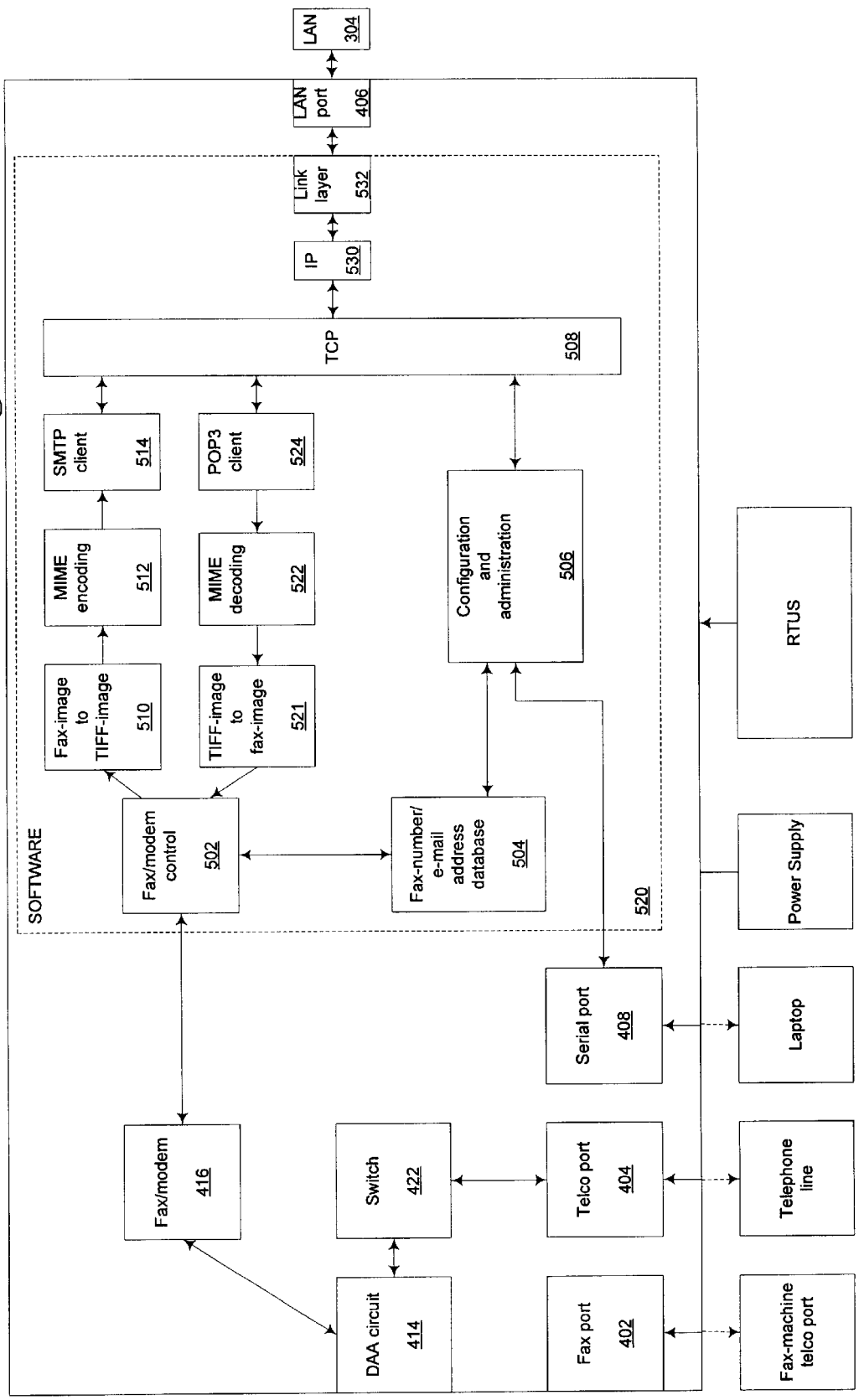
FIG. 5 illustrates the coupling of hardware and software elements of a fax interface unit in accordance with the present invention.

The functions provided by the microprocessor are best illustrated by the flow diagrams of FIGS. 6–17. FIG. 5 illustrates the interfaces between the hardware and the software of the fax interface unit. Elements coupled to the microprocessor over a memory bus 430 include dynamic random access memory (DRAM) 426, flash memory 428, and ethernet controller 424. The DRAM 426 is used for storing information to be processed and sent to the LAN 304 via the ethernet controller 424. The flash memory 428 stores application code, configuration code, the list of numbers and corresponding email addresses, an IP address of a local email server, and other information that must be saved when the fax interface unit is turned off. A clock and calendar integrated circuit 440 coupled to the microprocessor provides time and date information for email signals. A connect button 410 is provided as a means for initiating an interrogation of the local email server. A LCD display 418 provides a display for configuration information and for information from the local email server.

The combination of DAA circuit 414 and fax modem 416 serves as a coupling and converting circuit between the line emulator 422 and the switch 422. The DAA circuit 414 is coupled to the switch 422 for two way signal flow. The fax modem 416 is coupled to a port of the microprocessor and sends a digital data to the microprocessor when the local fax is sending a fax using the internet. When a fax signal from the local fax machine is directed by switch 422 to provide fax data to the microprocessor 420 it is necessary to convert an analog signal, the fax signal, to a digital signal that can be processed by the microprocessor. The DAA circuit provides an interface to the line from the switch that meets UL and phone company standards and protects the fax modem from transient voltages which may occur on the phone line. The fax modem demodulates the fax signal from the local fax machine producing digital data representing and identical to digital data in the fax machine. The microprocessor then converts the digital data to an email signal.

FIG. 5 is provided to illustrate the coupling between hardware elements of the fax interface unit 200 and software operating in the microprocessor 420. The fax modem 416, switch array 422, telephone circuitry 414 are shown coupled together similar to the arrangement of FIG. 4. The software element 520 contains programs and memory. elements for storing information and computer code. The computer code when operating as computer programs provides the functions necessary in an embodiment of the present invention. When digital data is sent from the fax modem 416 to the software element 520, a fax modem controller 502 directs the digital data to a image converter 510. The image converter converts the digital data, representing fax-image to a tagged information file format (TIFF) image signal. The output of the converter 510 is encoded by a mail encoder 512 to form an email signal. Although the mail encoder 512 in the embodiment of FIG. 5 applies MIME-encoding to the image signal, other encoders, such as a UUencoder may be applied for similar performance. The email signal is then processed by software elements well-known by those in the email field. The software elements include a simple mail transfer protocol ("SMTP") client 514, a TCP interface 508, an IP interface 530 and a link layer 532. The output of the software elements is then coupled to a LAN via the LAN port 406 as a LAN signal. When a remote email signal contained in a LAN signal arrives at the LAN port 406, the reverse process occurs however a POP3 client is used instead of an SMTP client. The remote email signal is then converted to a remote fax signal using mail decoder 522 and TIFF-image to fax-image deconverter 520. A fax database 504 stores numbers and associated email addresses. The control unit 506 provides overall configuration and administration functions. Flow charts providing a more detailed understanding of the software functions provided by programs within the microprocessor 420 are given in FIGS. 6 through 17.

Figure 6:
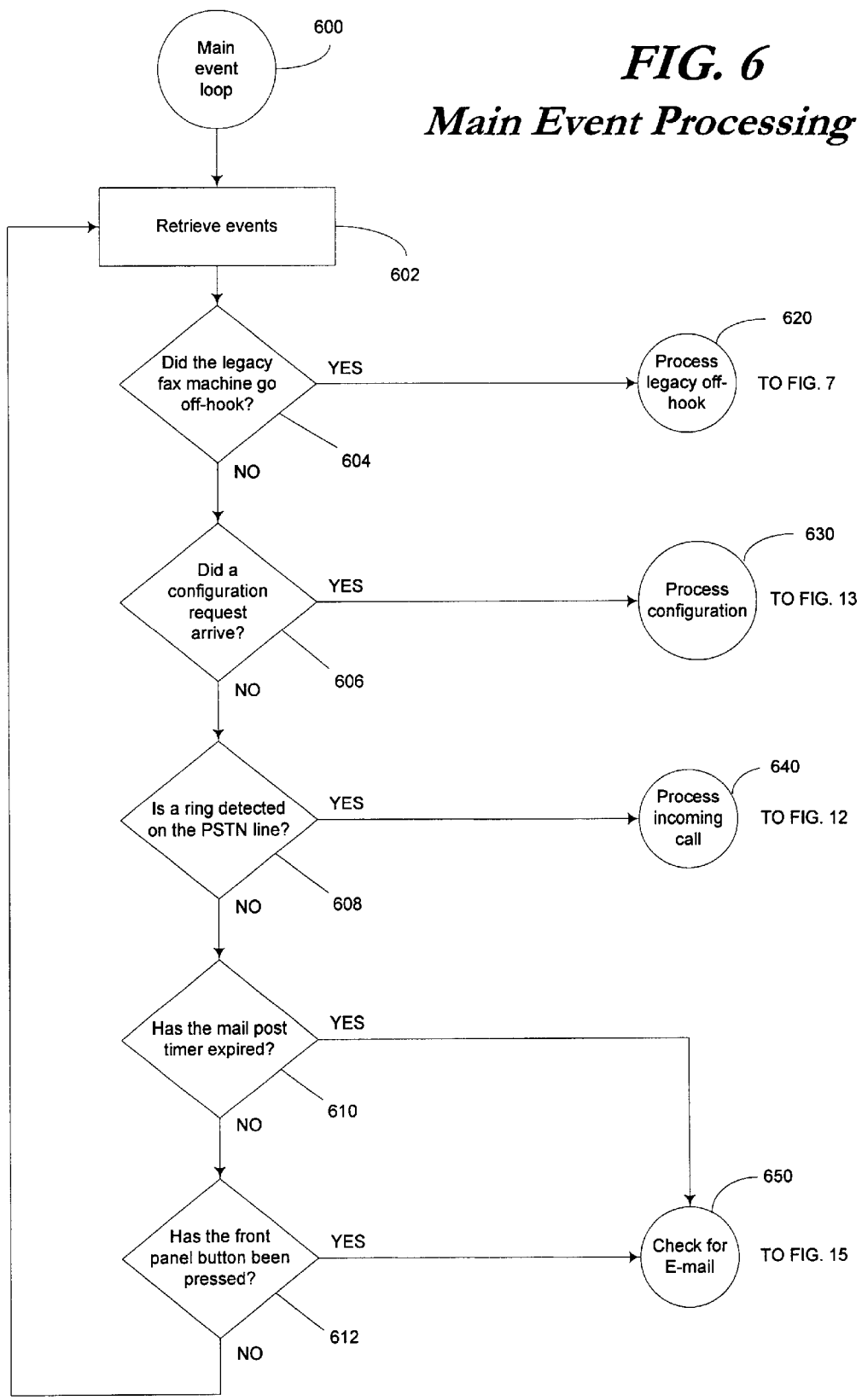
FIGS. 6 through 17 are flow charts illustrating the operation of software elements of the present invention.

The flow chart of FIG. 6 shows the main event loop for the software processes. The main event loop, having a starting step 600 monitors and retrieves events, step 602. When the fax machine goes off-hook, the off-hook condition is processed by off-hook program 620 via the yes path of decision block 604, otherwise the monitoring process continues to configuration request decision block 606. If a configuration request has arrived, the yes path of block 606, then configuration information is processed by program 630, otherwise ring detection is monitored via the no path of block 606 and ring decision block 608. If a ring is detected, the yes path of block 608, then an incoming call is processed by program 640, otherwise the local email server is monitored. If the mail poll timer has expired, the yes path of block 610, then the check for mail program 650 checks for mail, otherwise the monitoring process continues to the panel button decision block 612. If the button has been pressed program 650 checks for mail, otherwise the retrieve events process returns to start block 602 and repeats the steps contained in the loop.

Figure 7:
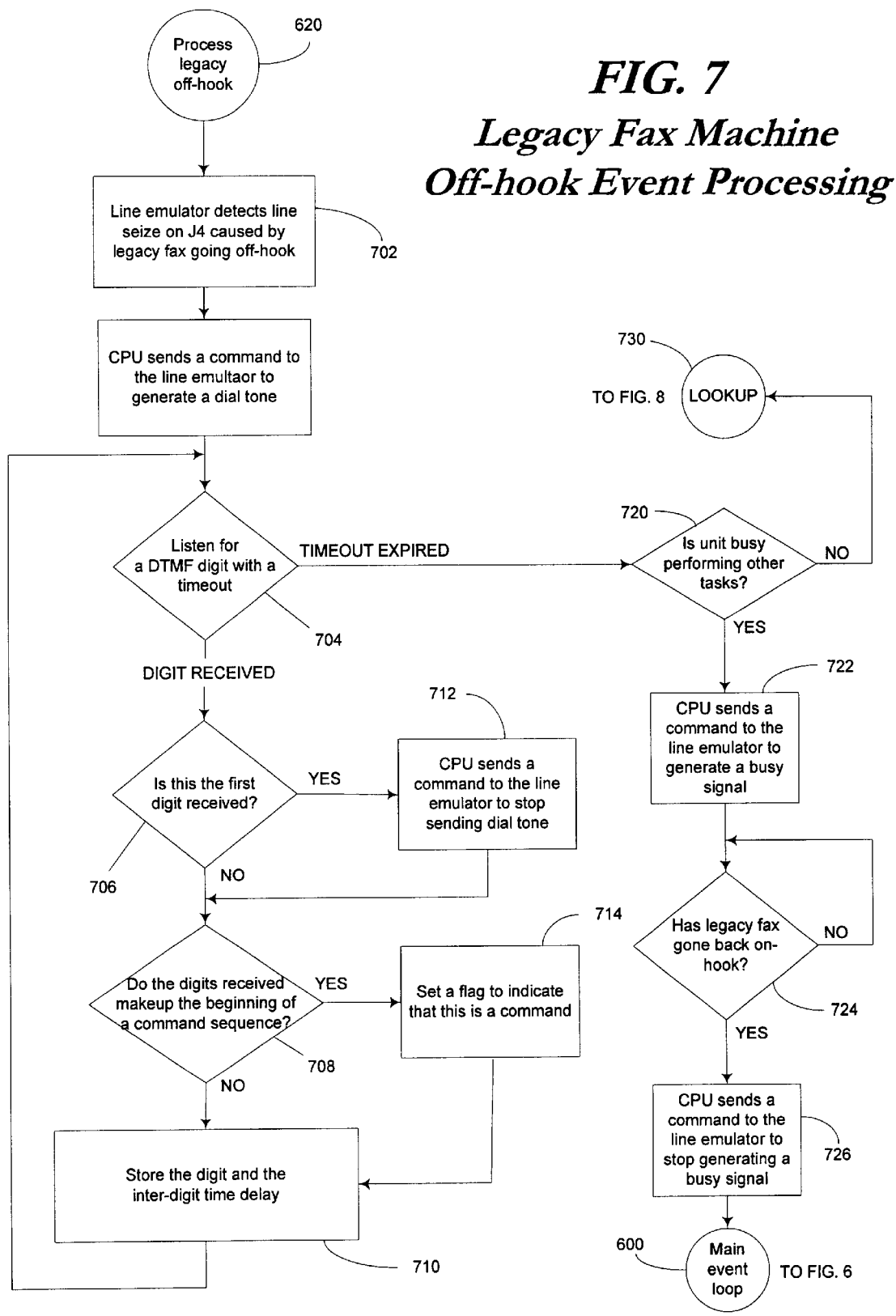

The off-hook process program 620 of FIG. 7 detects the line seize by fax machine on jack 402 and the line emulator generates an interrupt to the microprocessor, step 702. The microprocessor then commands the line emulator to send a dial tone to the fax machine, step 703. When the fax machine receives dial tone, the fax machine typically would send DTMF tones to the line emulator. The off-hook processing program 620 listens for the DTMF tones and takes the steps necessary receive a sequence of digits sent from the fax machine using steps 704, 706, 712, 708, 710 and 714. If the microprocessor cannot process an outgoing local fax call then a busy signal is sent back to the fax machine and the fax machine goes on hook, steps 722, 724, and 726. If the call can be processes then the lookup program 730 processes the sequence of digits.

Figure 8:
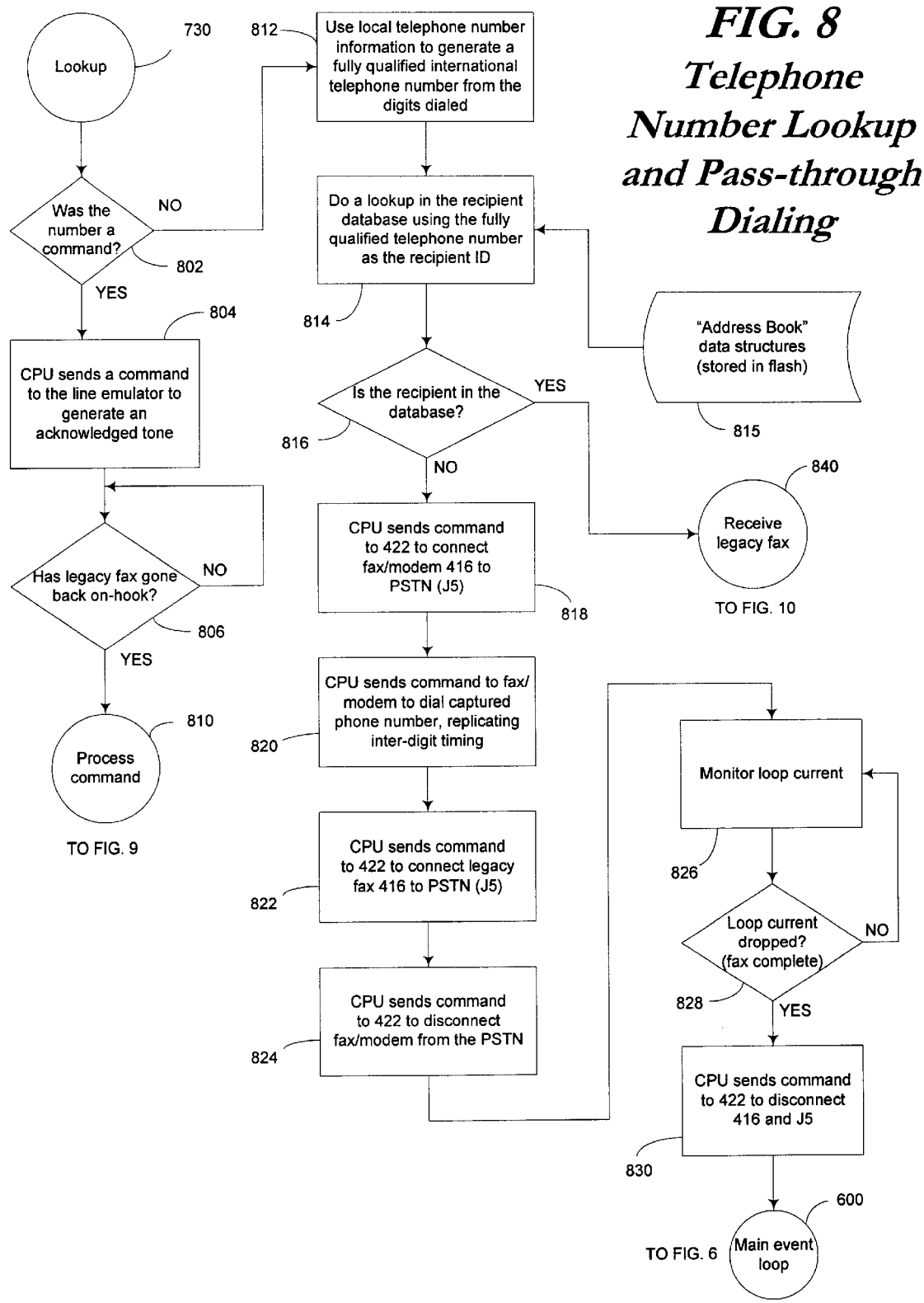
Figure 9:
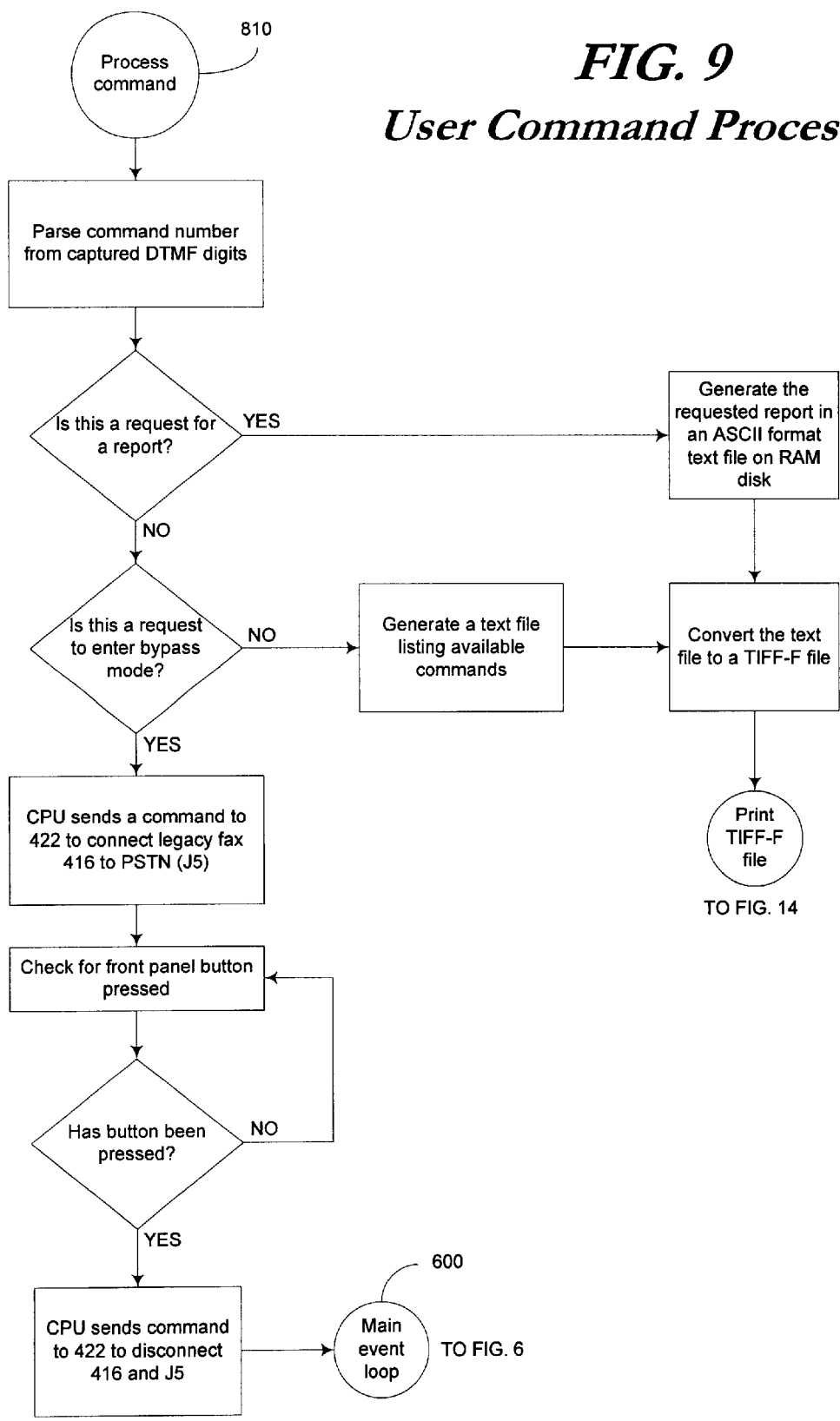
Figure 10:
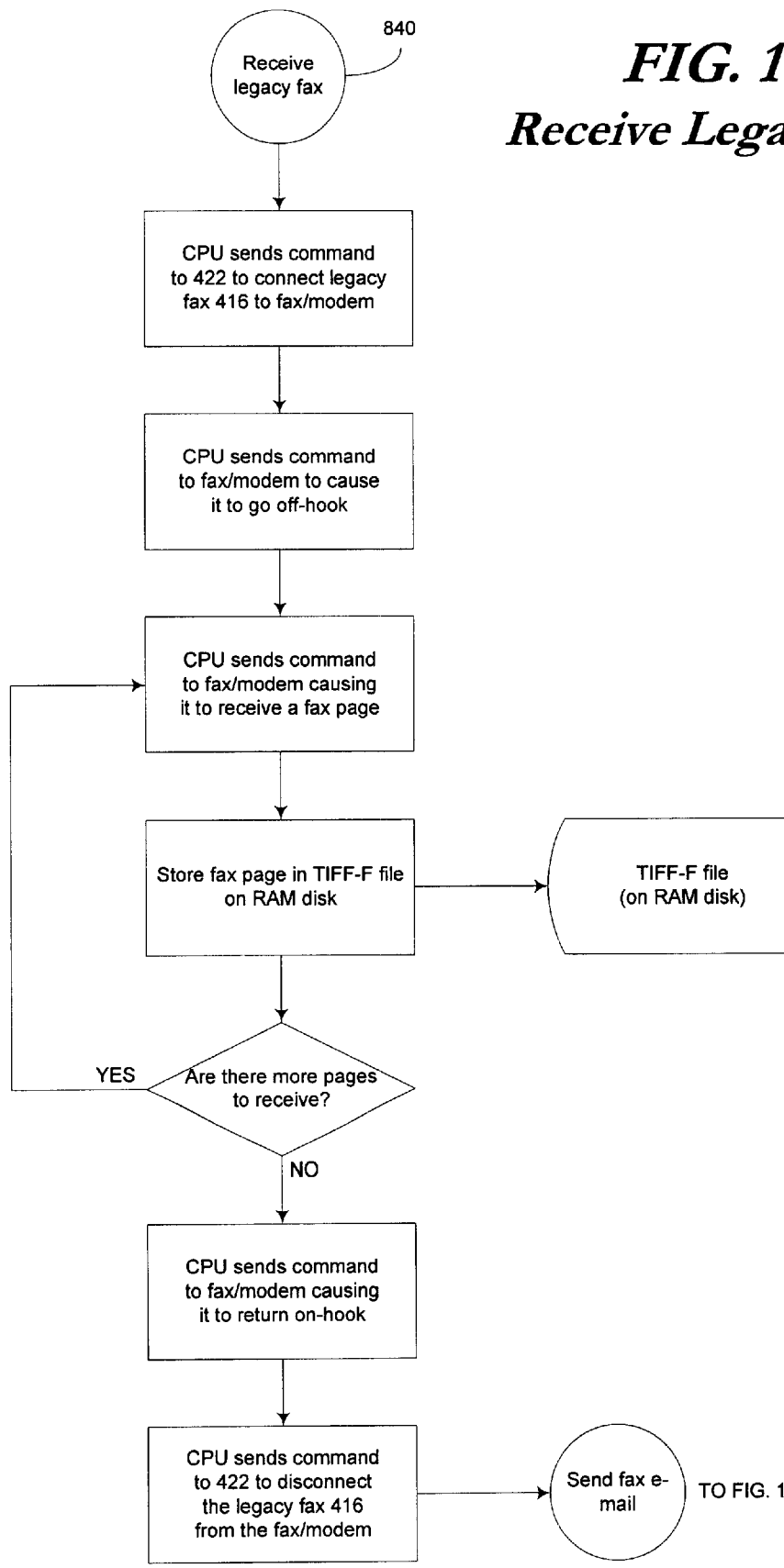
Figure 11:
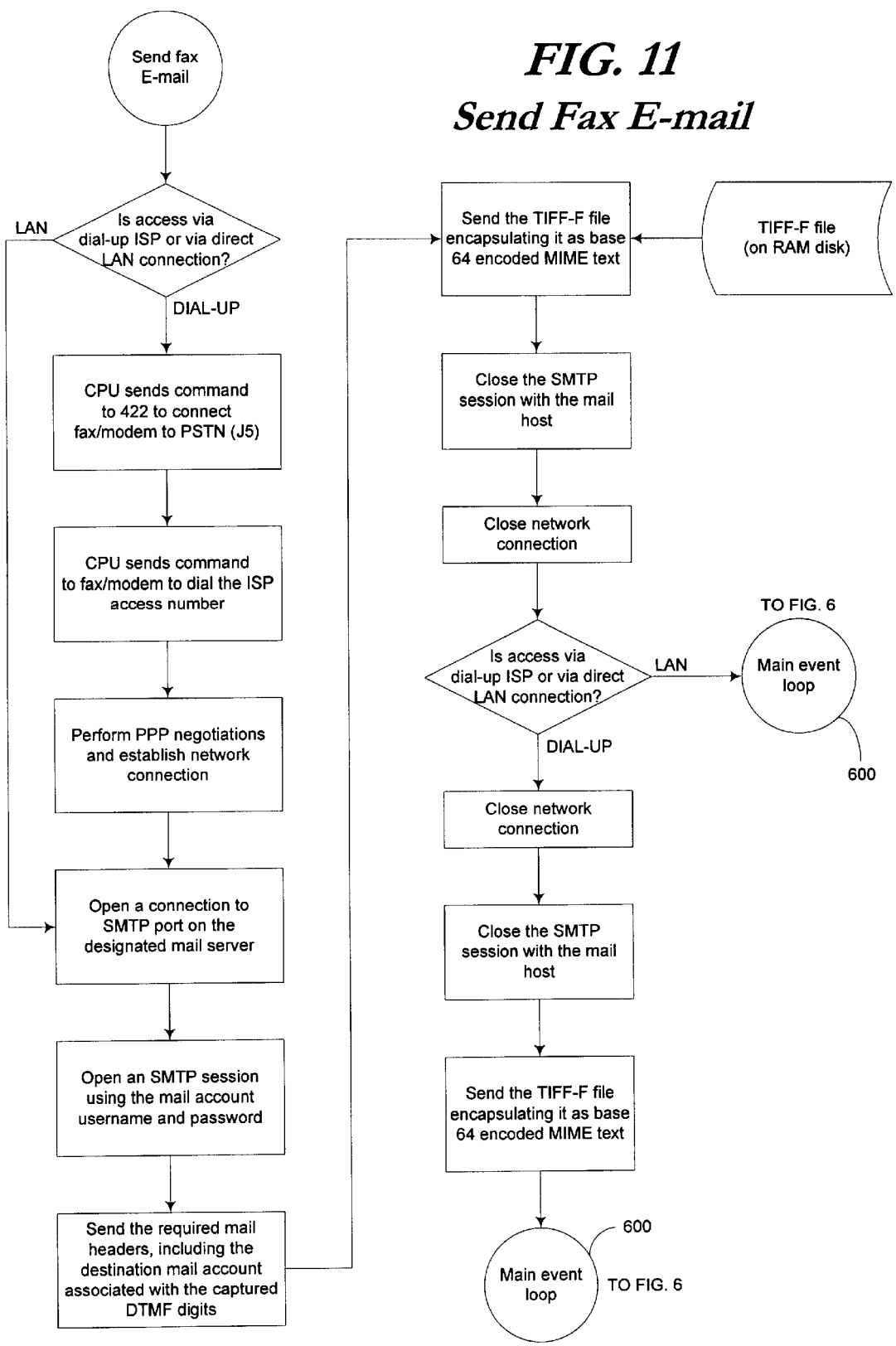
Figure 12:
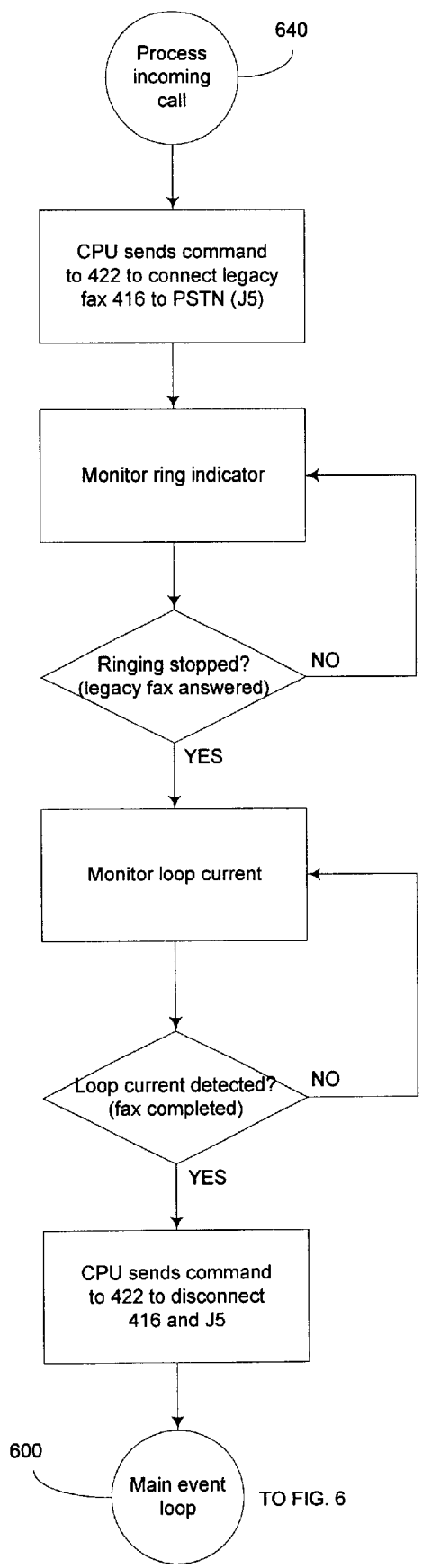
Figure 13:
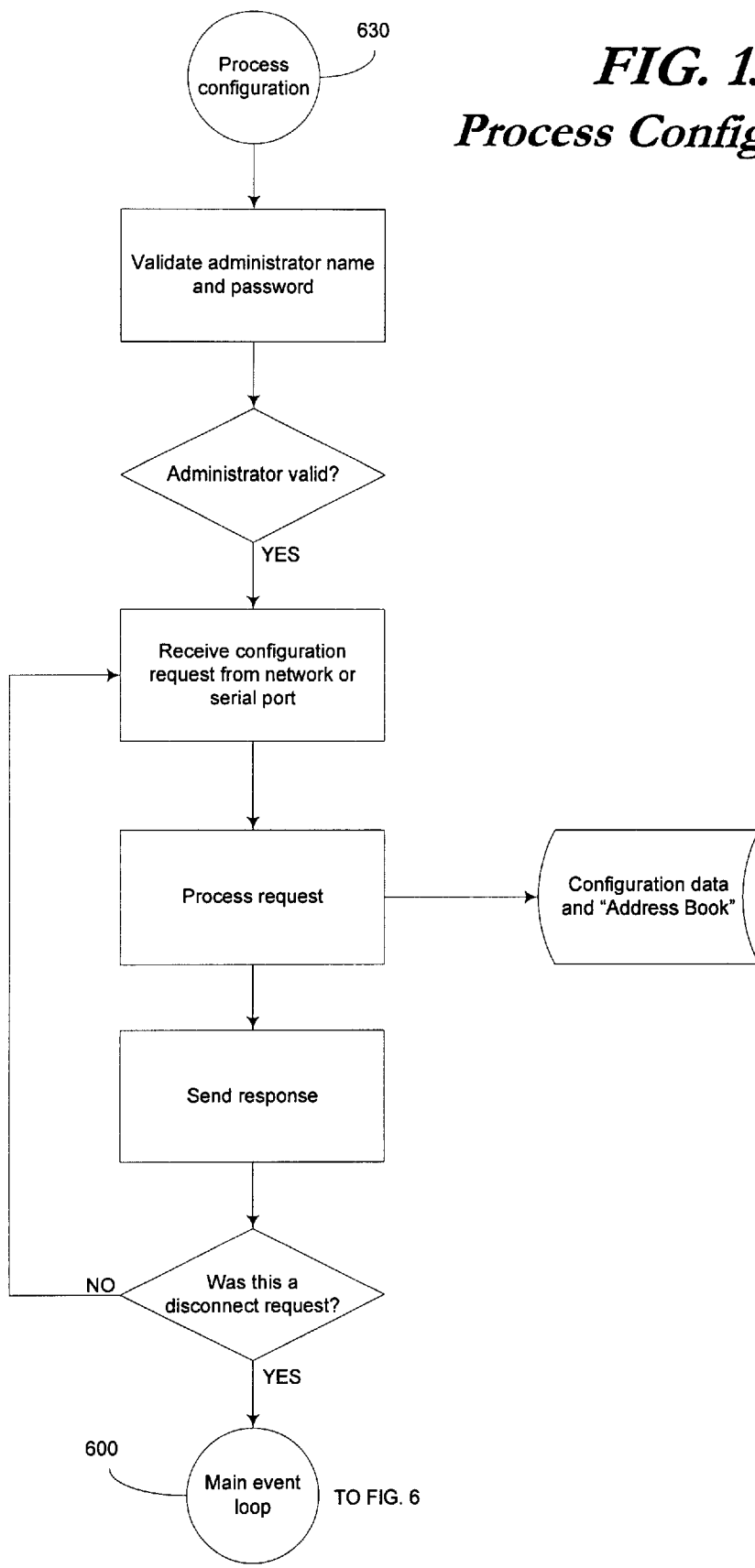
Figure 14:
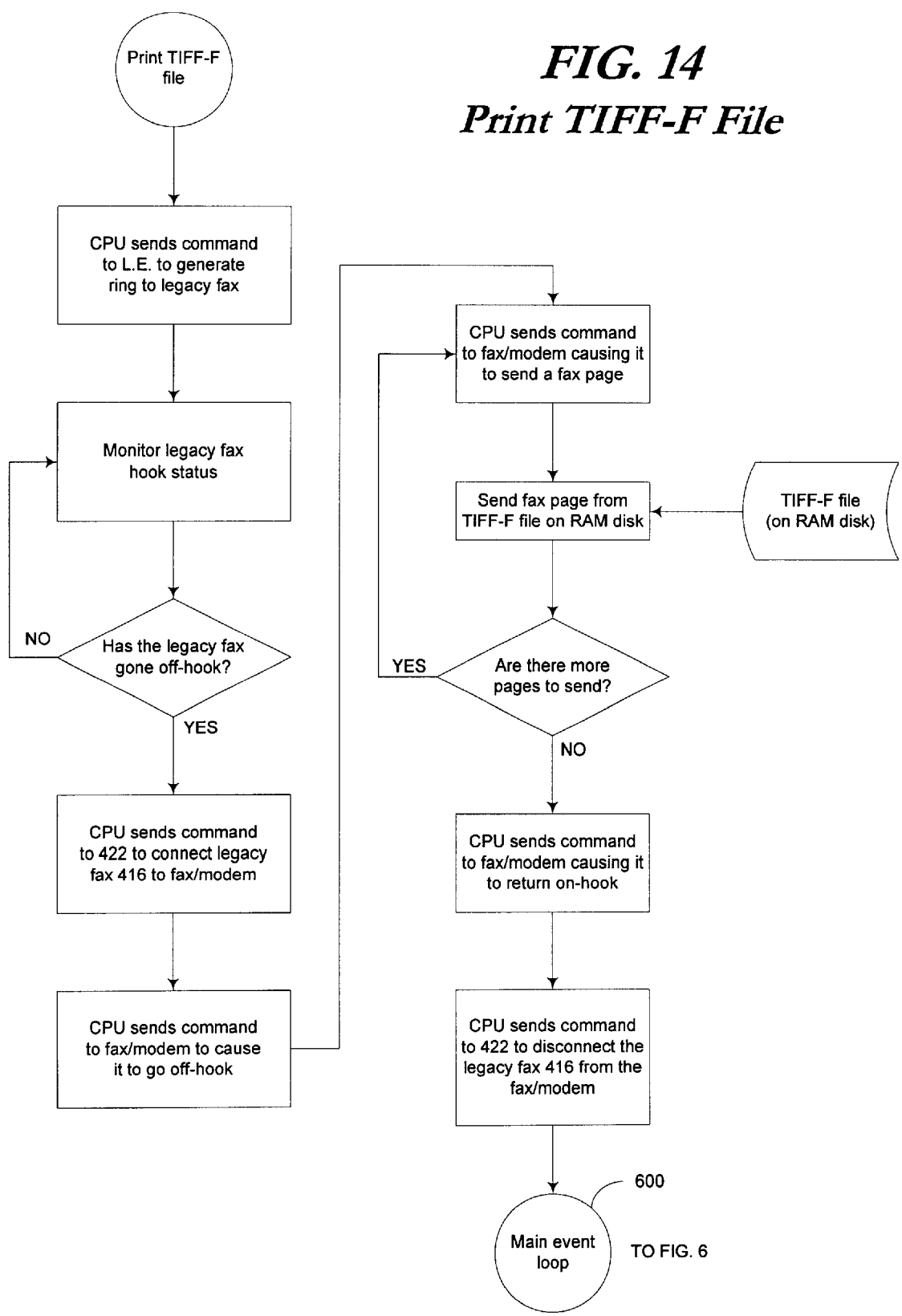
Figure 15:
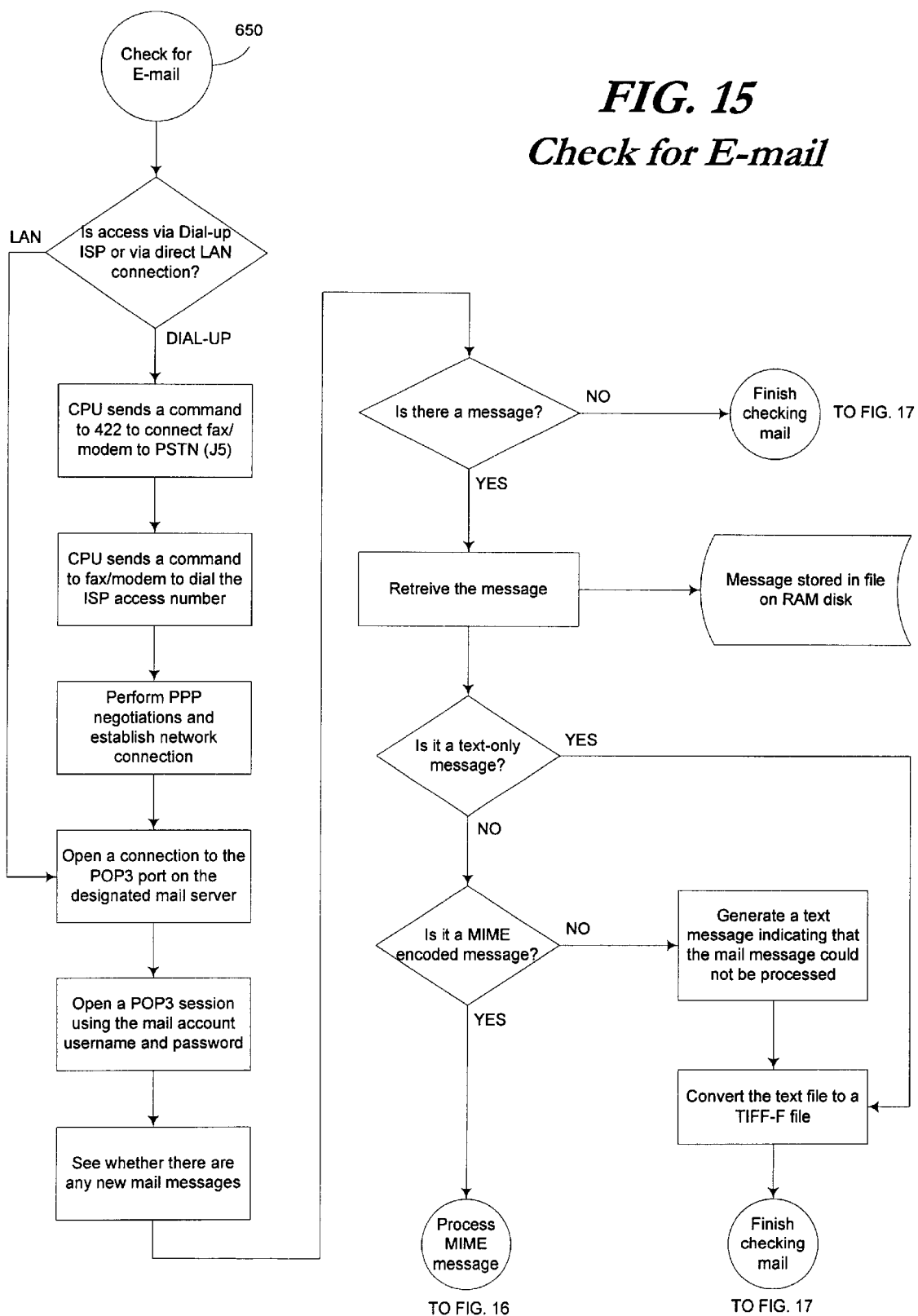
Figure 16:
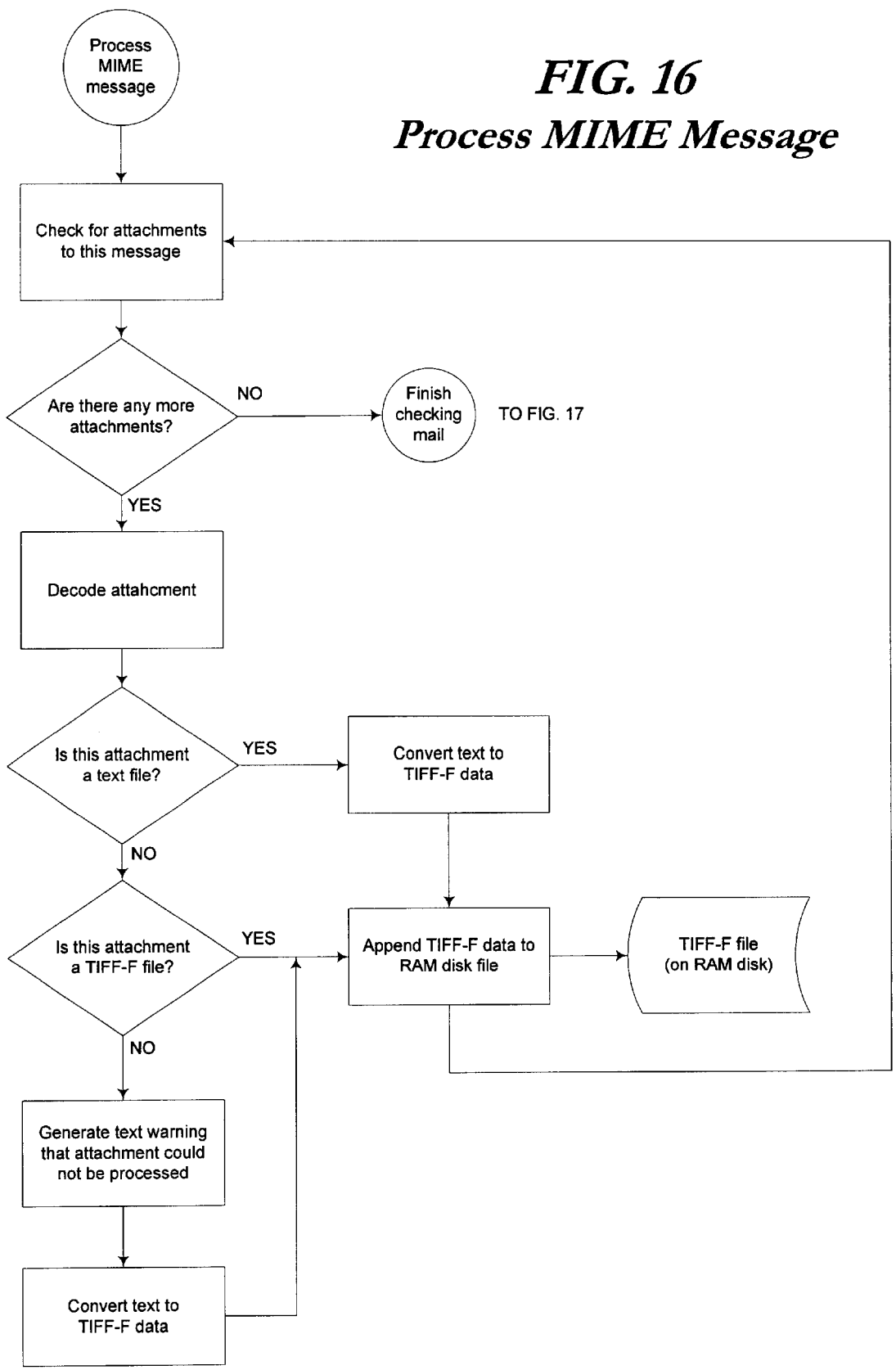
Figure 17:
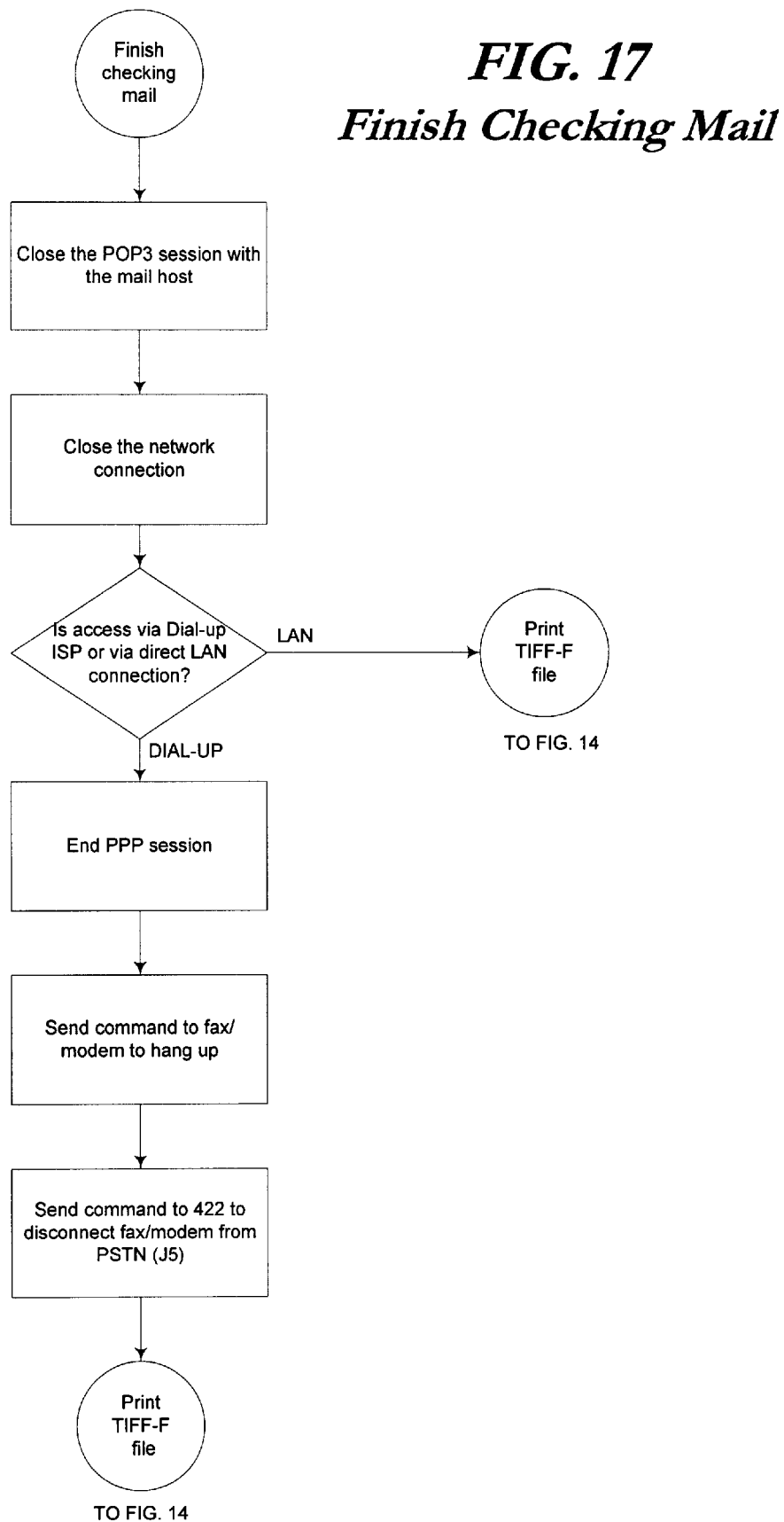

The look-up program 730 of FIG. 8 examines the sequence of digits which may include the asterisks ("*") symbol or the pound ("#") symbol to determine if the sequence was a number or a command, decision step 802. The yes path initiates a command processing procedure, steps 804 and 806. The no path of decision block 802 causes a search for an associate email to begin. The search routine is clearly described by the decision blocks and processing blocks of program 730. An novel step within the lookup program is the method for generating the numbers associated with the address book 815. Details of the method are briefly described in blocks 812 and 814. If an email number exists for the sequence of digits then the local fax machine sends a fax signal to the microprocessor for processing by receive legacy fax program 840. When no email address is found the fax is sent to the phone number dialed by the local fax machine using steps 818, 820, 822, 824, 826, 828, and 830.

The remaining flow charts of FIGS. 9 through 17 are provided to allow a person skilled in the art to practice the present invention without any undue experimentation. The steps within each flow chart would be understood by those skilled in the field to which the invention pertains. Because the flow charts represent steps required to implement the functions of the fax interface unit the programming language to implement the steps is not specified. Suitable languages for implementing the steps include "C", assembly language of the selected microprocessor, and other languages typically used for a product with an imbedded processor.

The present invention is not limited by any of the above described embodiments. Variations and modifications may be made without departing from the scope of the present invention as further defined by a set of claims.

We claim:

1. A method of communicating information from a local fax machine, comprising the steps of:

coupling said local fax machine to a fax interface unit, where said fax interface unit comprises a single modem, a hardware switch and a memory, said hardware switch having a first connection to a first communications network and a second connection to a second communications network;

storing a plurality of email addresses in said memory;

initiating a fax call at said local fax machine;

generating a fax signal, including a preassigned identifier associated with said fax call;

receiving, at said fax interface unit, said preassigned identifier;

determining whether said preassigned identifier corresponds to one of said email addresses;

controlling a state of said hardware switch in order to direct said signal through said single modem to either said first or said second communications networks;

converting said fax signal to an email signal, if said one email address corresponds to said preassigned identifier;

sending said email signal to said corresponding one of said email addresses through said first connection and across said first communications network; and routing said fax signal through said second connection and across said second communications network, if said one email address does not correspond to said preassigned identifier.

2. The method of claim 1, wherein said preassigned identifier is a telephone number.

3. The method of claim 1, wherein the step of converting said fax signal to an email signal comprises the steps of:

demodulating said fax signal;

converting said demodulated fax signal to a TIFF-image; and mail encoding said TIFF-image, thereby generating said email signal.

4. A fax interface apparatus for communicating information from a local fax machine, comprising:

a single modem;

a hardware switch adapted to selectively route a signal from said local fax machine to either a first communications network or a second communications network;

memory for storing a plurality of email addresses; and logic configured to receive, from said local fax machine, a preassigned identifier associated with said signal, said logic configured to determine whether said preassigned identifier corresponds to at least one of said email addresses, said logic further configured to control said hardware switch such that said signal is routed through said single modem and across said first communications network if said logic identifies a corresponding email address;

wherein said single modem is configured to demodulate said signal into a demodulated signal, and wherein said logic is configured to convert said demodulated signal into an email signal and to send said email signal to said corresponding email address.

5. The apparatus of claim 4, wherein said preassigned identifier is a telephone number.

6. The apparatus of claim 4, wherein said logic controls said hardware switch such that said signal is routed through said single modem and across said second communications network if said logic fails to identify a corresponding email address.

7. A fax interface apparatus, comprising:

a hardware switch;

a first connection coupled to a local fax machine;

a second connection coupled to a first communications network and to said hardware switch;

a third connection coupled to a second communications network and to said hardware switch;

memory for storing a plurality of email addresses; and logic configured to receive a preassigned identifier transmitted across said first connection from said local fax machine, said logic further configured to determine whether said received preassigned identifier corresponds to one of said plurality of email addresses, said logic further configured to convert a signal from said local fax machine into an email signal if said logic identifies a corresponding email address and to route said email signal through said hardware switch and across said second connection to said first communications network, said logic still further configured to control said hardware switch such that said signal is routed through said hardware switch and across said third connection to said second communications network if said logic fails to identify a corresponding email address.

8. The apparatus of claim 7, wherein said logic is further configured to send said email signal over said first communications network to said corresponding email address.

9. A fax interface apparatus, comprising:

a hardware switch;

a first connection coupled to a local fax machine;

a second connection coupled to a first communications network and to said hardware switch;

a third connection coupled to a second communications network and to said hardware switch;

memory for storing a plurality of email addresses; and logic configured to receive a preassigned identifier transmitted across said first connection from said local fax machine, said received preassigned identifier identifying a communications device of an intended recipient of a signal transmitted from said local fax machine, said logic further configured to determine whether said received preassigned identifier corresponds to one of said plurality of email addresses, said logic further configured to convert said signal into an email signal and to transmit said email signal to said communications device of said intended recipient by way of said corresponding email address through said single modem and said second connection and across said first communications network if said logic identifies such a correspondence between said received preassigned identifier and said one of said email addresses, said logic still further configured to control said hardware switch such that said signal is routed through said single modem and said third connection and across said second communications network if said logic fails to convert said signal into an email signal.

10. A fax interface method, comprising the steps of:

providing a hardware switch and a plurality of connections, said hardware switch coupled to said plurality of connections;

storing a plurality of email addresses;

receiving a preassigned identifier from a local fax machine;

determining whether said received preassigned identifier corresponds to one of said plurality of email addresses;

receiving, via one of said plurality of connections, a signal from said local fax machine;

converting said signal into an email signal if a correspondence between said received preassigned identifier and said one of said email addresses is determined; and controlling said hardware switch based on said determination;

wherein said hardware switch, when open, enables said email signal to be communicated across a first of said plurality of connections to a first communications network, and when said hardware switch is closed, enables said signal to be communicated across a second of said plurality of connections to a second communications network.

11. A fax interface method for communicating information from a local fax machine, comprising the steps of:

providing a fax interface apparatus having a single modem and a hardware switch;

transmitting a signal from said local fax machine to said fax interface apparatus, said signal associated with a preassigned identifier;

storing a plurality of email addresses;

determining whether said preassigned identifier corresponds to at least one of said email addresses;

selectively routing, via said hardware switch, said signal between said local fax machine and either a first communications network or a second communications network based on said correspondence determination;

demodulating said signal, via said single modem, into a demodulated signal if said signal is routed to said first communications network in the selective routing step;

converting said demodulated signal into an email signal; and sending said email signal to said one of said email addresses that corresponds to said preassigned identifier.

12. The method of claim 11, wherein said preassigned identifier is a telephone number.

* * * * *